United States Patent [19]

Ohkanda

[11] Patent Number: 5,155,914
[45] Date of Patent: Oct. 20, 1992

[54] RECIPROCATING SAW-BLADE DEVICE
[75] Inventor: Masao Ohkanda, Sagamihara, Japan
[73] Assignee: Kioritz Corporation, Tokyo, Japan
[21] Appl. No.: 829,188
[22] Filed: Jan. 31, 1992
[30] Foreign Application Priority Data Feb. 1, 1991 [JP] Japan .................................. 3-11949

[51] Int. Cl.$^5$ ............................................. B23D 49/10
[52] U.S. Cl. ........................................ 30/369; 30/208; 30/216; 30/392
[58] Field of Search ................ 30/392, 394, 208, 216, 30/228, 369, 502, 210; 56/123, 158, 236, 242; 83/618, 623, 628

[56] References Cited

U.S. PATENT DOCUMENTS

| | | | |
|---|---|---|---|
| 1,693,707 | 12/1928 | Dishmaker | 30/218 |
| 3,016,932 | 1/1962 | Jacobson | 30/369 |
| 3,083,457 | 4/1963 | Ottosen et al. | 30/216 |
| 3,146,810 | 9/1964 | Keesling | 30/394 |
| 3,579,827 | 5/1971 | Grahn | 30/216 |
| 3,802,075 | 4/1974 | Taylor et al. | 30/216 |
| 4,619,045 | 10/1986 | Mayer | 30/216 |
| 4,856,195 | 8/1989 | Grossmann et al. | 30/369 |
| 5,079,841 | 1/1992 | Ohkanda et al. | 30/228 |
| 5,083,376 | 1/1992 | Lentino | 30/392 |

FOREIGN PATENT DOCUMENTS 56-3728U 1/1981 Japan .

Primary Examiner—Frank T. Yost
Assistant Examiner—Hwei-Siu Payer
Attorney, Agent, or Firm—Browdy and Neimark

[57] ABSTRACT

A reciprocating saw-blade device includes: a case; a main spindle rotatably supported by the case; bearings respectively arranged in front and rear end sections of the case; upper and lower saw blades protruding forward beyond the case and supported by the bearings in such a manner as to be slidable in the longitudinal direction thereof; eccentric cams formed on the main spindle such as to be axially spaced away from and 180° out-of-phase with respect to each other; connecting rods respectively having big end portions pivotably connected with the eccentric cams and small end portions extending along the saw blades toward the rear end section of the case, where they are pivotably connected with the saw blades; and laterally-curved portions formed on the blades and extending in the longitudinal direction on one side of a middle section of the main spindle.

1 Claim, 3 Drawing Sheets

RECIPROCATING SAW-BLADE DEVICE

BACKGROUND OF THE INVENTION

This invention relates to a reciprocating saw-blade device.

A reciprocating saw-blade device having upper and lower elongated saw blades has been known as a cutting machine such as a glass trimmer; the upper and lower saw blades make a relative reciprocating movement in the longitudinal direction thereof, thereby cutting grass, trees, etc. In such a device, the torque of the engine or the like is converted to a reciprocating movement of the saw blades as it is transmitted to the saw blades through a power conversion mechanism consisting of a main spindle, eccentric cams, and connecting rods; this power conversion mechanism extends on one side of the main spindle.

A problem with conventional saw-blade devices of the type described above is that the saw blades are supported in a cantilever-like fashion by their respective connecting rods so as to guide their reciprocating movement, resulting in rather poor structural strength. Further, the movements of the connecting rods and saw blades are rather unstable; and, since the saw blades are widely offset with respect to the main spindle, this structure provides only a limited cutting width and has rather poor operability.

SUMMARY OF THE INVENTION

The present invention has been made with a view to eliminating the above problems in the prior art. In the reciprocating saw-blade device of this invention, the saw blades are supported by front and rear bearings, that is, supported at two points, so that greater structural strength can be achieved; the saw blades extend between the eccentric cams so that the big end portions of the connecting rods are minimized in their thrust deviation; and, further, the connecting rods are mounted on the opposite side of the saw blades.

In accordance with this invention, there is provided a reciprocating saw-blade device comprising: a case; a main spindle rotatably supported by the case; bearings respectively arranged in front and rear end sections of the case; upper and lower saw blades protruding forward beyond the case and supported by the bearings in such a manner as to be slidable in the longitudinal direction thereof; eccentric cams formed on the main spindle such as to be axially spaced away from and 180° out-of-phase with respect to each other; connecting rods having big end portions pivotably connected with the eccentric cams and small end portions extending along the saw blades toward the rear end section of the case, where they are pivotably connected with the saw blades; and laterally-curved portions formed on the blades and extending in the longitudinal direction on one side of a middle section of the main spindle.

In this structure, the saw blades are supported by bearings which are arranged in both the front and rear end sections of the case, that is, supported at two points, so that greater mechanical strength can be obtained; thus, the device can withstand severe operating conditions. Further, since the blades are arranged such as to extend between the eccentric cams, it is possible to minimize the thrust deviation or the big end portions of the connecting rods, and the movement to the connecting rods can be stabilized. Moreover, since the connecting rods are mounted on the opposite side of the saw blades, it is possible to arrange the saw blades nearer to the reduction gear means, thereby improving operability.

DESCRIPTION OF THE PREFERRED EMBODIMENT

Figure 1:
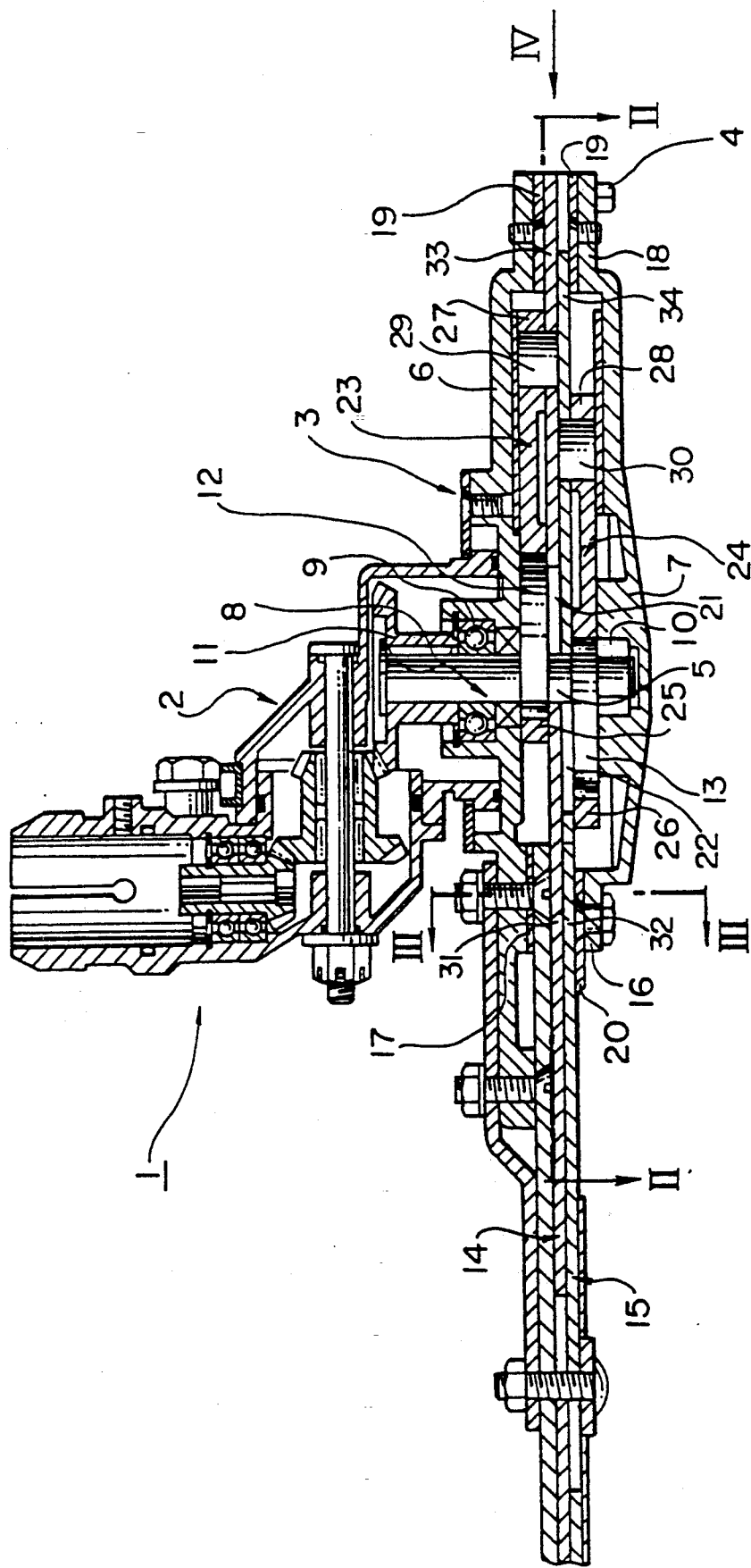
FIG. 1 is a side sectional view of a reciprocating saw-blade device in accordance with an embodiment of this invention as applied to a grass trimmer.
Figure 2:
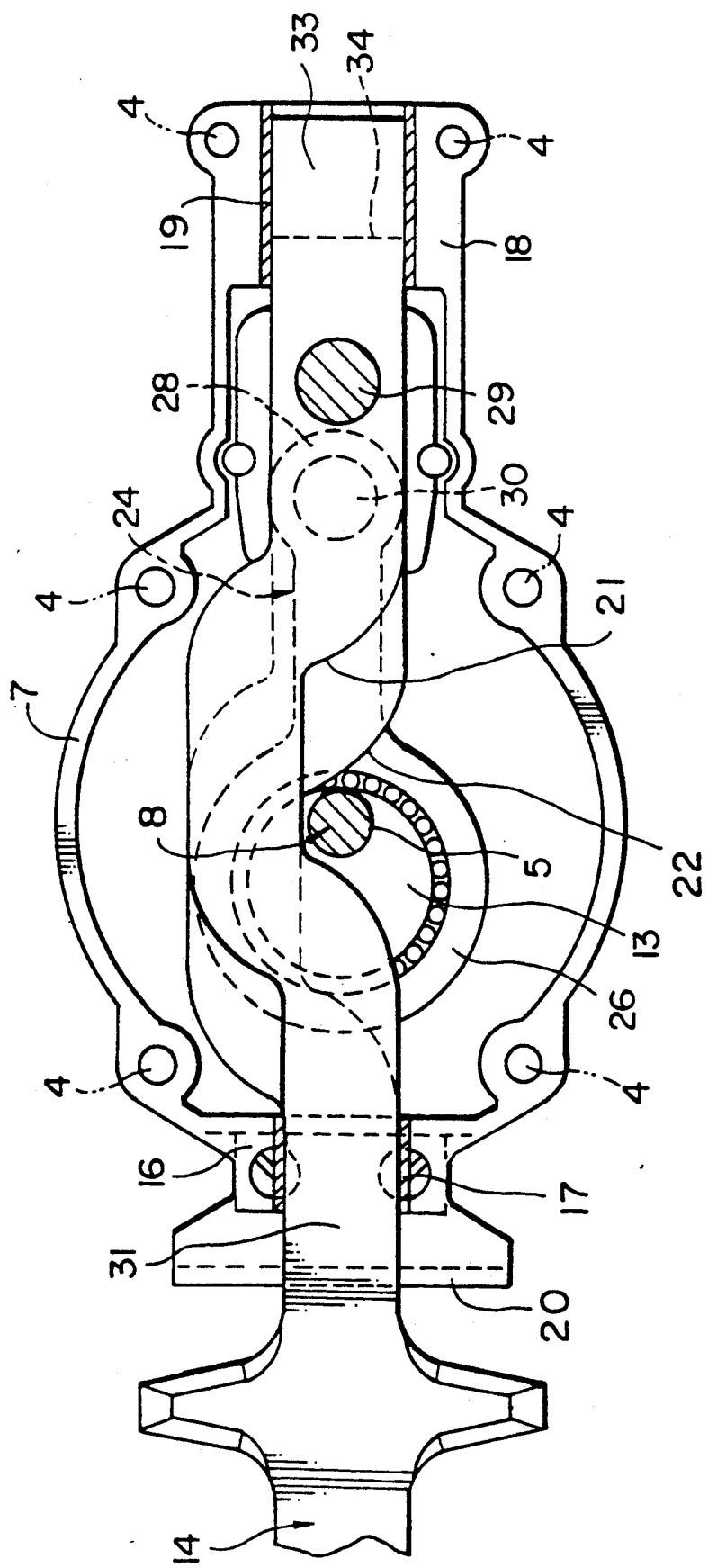
FIG. 2 is a plan view taken along the line II—II of FIG. 1.
Figure 3:
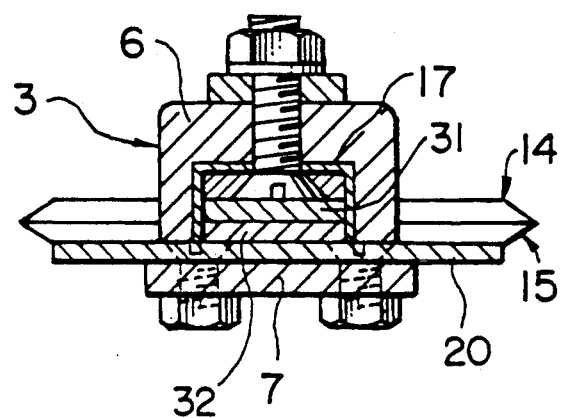
FIG. 3 is a sectional view taken along the line III—III of FIG. 1.
Figure 4:
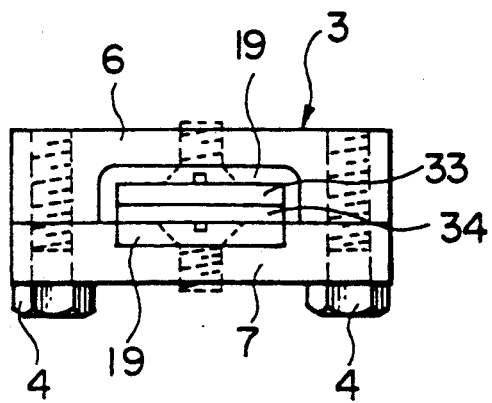
FIG. 4 is an end view of FIG. 1 viewed from the direction of the arrow IV.

An embodiment of the present invention, which is applied to a grass trimmer, will be described with reference to the accompanying drawings.

A reciprocating saw-blade device 1 in accordance with this invention includes a reduction gear means 2 connected to one end of an operating rod (not shown) of the grass trimmer, and a case 3 mounted on an end portion of the reduction gear means 2 in such a manner as to be able to change its angle and composed of upper and lower halves 6 and 7 integrally connected together by means of a plurality of bolts 4. A main spindle 8, which is driven by a transmission shaft (not shown) in the operating rod, is rotatably supported in an upright position by the case 3 through bearings 9 and 10; the main spindle 8 is connected to an output end 11 of the reduction gear means 2. Integrally formed on the main spindle 8 are a pair of circular eccentric cams 12 and 13 axially spaced away from each other; these eccentric cams are arranged 180° out-of-phase with respect to each other.

Further, a pair of elongated saw blades 14 and 15 are arranged such as to protrude forward beyond the case 3. The front and rear sections (31 and 32) and (33 and 34) of these saw blades which are inside the case 3 are respectively supported by bearings 17 and 19 which are respectively provided in the front and rear end sections 16 and 18 of the case 3; these saw blades are arranged such as to be longitudinally slidable with respect to each other. The bearing 17 in the front end section 16 of the case 3 is equipped with an integrally formed stationary blade 20, which is supported by a lower wear plate protruding forward beyond the lower half 7 of the case 3; thus, the cutting of grass, etc. can also be effected with the edge of the front end section 16 of the case 3. The saw blades 14 and 15 have laterally-curved portions 21 and 22 situated in the middle section of the case 3. These laterally-curved „ portions 21 and 22 are held between the upper and lower eccentric cams 12 and 13 such that they extend on one side of a middle section 5 of the main spindle 8; by virtue of this arrangement, the saw blades 14 and 15 are prevented from colliding against the main spindle 8 during their reciprocating movement and, further, the positional control of the device components can be effected more reliably.

Pivotably connected with the eccentric cams 12 and 13 are big end portions 25 and 26 of connecting rods 23 and 24, which extend rearwards along the upper and lower saw blades 14 and 15, respectively; small end portions 27 and 28 of the connecting rods 23 and 24 are pivotably connected with the saw blades 14 and 15 by means of pins 29 and 30, respectively. Thus, when the main spindle 8 is rotated by the reduced torque from the reduction gear means 2, the saw blades 14 and 15 are caused to reciprocate 180° out-of-phase with respect to each other through the connecting rods 23 and 24, whereby grass, etc. can be cut.

Further, it is also possible for the rear sections 33 and 34 of the saw blades 14 and 15 to extend outwards beyond the rear end section 18 of the case 3 so as to form saw-blade sections also on the rear side of the device, whereby the cutting width of the device can be enlarged.

What is claimed is:

1. A reciprocating saw-blade device comprising: a case; a main spindle rotatably supported by said case; bearings respectively arranged in front and rear end sections of said case; upper and lower saw blades protruding forward beyond said case and supported by said bearings in such a manner as to be slidable in a longitudinal direction thereof; eccentric cams formed on said main spindle such as to be axially spaced away from and 180° out-of-phase with respect to each other; connecting rods respectively having big end portions pivotably connected with said eccentric cams and small end portions extending along said saw blades toward the rear end section of said case, where they are pivotably connected with said saw blades; and laterally-curved portions formed on said blades and extending in a longitudinal direction parallel to said blades on one side of a middle section of said main spindle.

* * * * *